United States Patent [19]

Okoshi

[11] Patent Number: 4,523,863
[45] Date of Patent: Jun. 18, 1985

[54] THRUST BALL BEARING

[75] Inventor: Hideo Okoshi, Fujisawa, Japan

[73] Assignee: Nippon Seiko Kabushiki Kaisha, Tokyo, Japan

[21] Appl. No.: 541,969

[22] Filed: Oct. 14, 1983

[30] Foreign Application Priority Data

Oct. 25, 1982 [JP] Japan ................................ 57-185958

[51] Int. Cl.³ ........................ F16C 19/10; F16C 33/58
[52] U.S. Cl. .................................... 384/609; 384/614; 384/615
[58] Field of Search ................... 308/189 R, 201, 216, 308/217, 219, 227, 230, 232, 233, 235

[56] References Cited

U.S. PATENT DOCUMENTS

| 1,423,666 | 7/1922 | Langhaar | 308/235 |
| 1,538,564 | 5/1925 | Leon | 308/230 |
| 3,455,618 | 2/1969 | Wehner | 308/233 |
| 3,503,661 | 3/1970 | Taylor et al. | 308/201 X |
| 3,811,744 | 5/1974 | Wren et al. | 308/235 |
| 3,847,456 | 11/1974 | Schwarzbich | 308/235 X |
| 4,153,309 | 5/1979 | Markfelder et al. | 308/201 X |
| 4,398,778 | 8/1983 | Kraus | 308/235 |

Primary Examiner—Stuart S. Levy
Assistant Examiner—David Werner
Attorney, Agent, or Firm—Shapiro and Shapiro

[57] ABSTRACT

A thrust ball bearing using balls as the rolling members of the bearing comprises first and second races having track grooves having a cross-sectional radius slightly greater than the radius of the balls, a retainer for retaining the balls interposed between the first and second races, and a third race circumscribing the balls and positioning the balls slightly inwardly of the track diameter of the bearing.

8 Claims, 14 Drawing Figures

THRUST BALL BEARING

BACKGROUND OF THE INVENTION

1. Field of the Invention

This invention relates to a thrust ball bearing, and more particularly to a thrust ball bearing of great load capacity and low friction which requires high-speed rotation or a thrust ball bearing having the same degree of load capacity as the ordinary bearing and yet used for low friction or high-speed rotation and long in life and easy and inexpensive to manufacture.

2. Description of the Prior Art

With the recent tendency toward higher speed of the support bearings in machine tool main spindles, jet engines, gas turbines, high pressure pumps, traction drive infinitely variable transmissions or ball screws, the friction loss due to the spin of balls during the rotation of the bearing is great in the conventional thrust ball bearings and, if the centrifugal force applied to the balls with the high-speed rotation becomes greater, the spin loss doubles and the efficiency of the instruments is significantly reduced. For this reason, it is a matter of common knowledge to consider thrust ball bearings unusable for such applications. Accordingly, angular ball bearings or the like which are capable of effecting high-speed rotation have heretofore been used for these applications. However, thrust ball bearings are apparently more advantageous in respect of the thrust load capacity and friction torque during low-speed rotation and therefore, realization of thrust ball bearings of low friction capable of effecting high-speed rotation has been demanded.

U.S. Pat. No. 3,455,618 more or less meets such demand. The invention of this patent is such that, as shown in FIG. 1 of the accompanying drawings, the smooth track surfaces 24 and 26 of races 20 and 22 are conically disposed so that the cone center d is coincident with the center axis l of the bearing, and a control ring 30 is fitted to the circumscribed circle of each ball 28. Accordingly, as shown in FIG. 2 of the accompanying drawings, the contact ellipses A", B" and C" between the balls and each track surface are substantially circular small points and the surface pressure thereof is quite high. Although centrifugal force of the balls during high-speed rotation is irrelevant to thrust load, the influence of centrifugal force on the bearing is substantial; lubricant can hardly be supplied to the point of contact C between the ball 28 and the control ring 30. Moreover, the invention of this patent cannot be practically used for high load and high-speed rotation and can merely be used in the case of light load, medium speed and low friction torque experienced in clutch release, as described in the specification of the patent.

In contrast with this U.S. patent, in the conventional popular thrust ball bearing, as shown in FIG. 3 of the accompanying drawings, the cross section of the track grooves of races 1 and 2 is arcuate and therefore, the area of the contact ellipse between the track surface and the ball is great, and the thrust load capacity is maximum because the positions A and B of the load points of the balls 3 are set to $\theta = 90°$ relative to the plane of revolution of the balls, as shown. On the other hand, the tangential lines at the load points A and B are parallel to each other and do not intersect each other and therefore, great spin motion occurs between the balls and the groove. The friction loss resulting from such spin is great as compared with other factors such as elastic hysteresis and differential slippage. Furthermore, when the bearing rotates at a high speed, centrifugal force acts on the balls and the points A and B become deviated outwardly and therefore, the spin loss is further increased. Thus, it has been practically difficult to use such bearing during high-speed rotation.

It is known that this spin loss becomes theoretically null if the tangential lines at the load points of the balls and the grooves are made to intersect each other on the center axis of the bearing. Accordingly, if a member such as the control ring 30 of the aforementioned U.S. patent is fitted to the circumscribed diameter of the ball and the point of intersection between the tangential lines is linked with the center axis as described above with the balls placed inwardly of the track diameter, the spin loss between the track surface and the ball becomes null, but if a great thrust load which the track can withstand is applied to the track, a very great surface pressure is created at the point of contact between the ball and the control ring 30 as previously noted and an impression is created in the track surface of the control ring 30 and thus, such thrust ball bearing cannot be practically used.

SUMMARY OF THE INVENTION

The present invention solves the above-noted problems, and is entirely different in technical concept from the known invention of the aforementioned U.S. patent (conical ball bearing), and is characterized in that a third race of arcuate cross-sectional shape is provided so that the position of the load point of the track groove and the balls lies slightly inwardly of the position of the bottom of the track groove, namely, the position of the track diameter of the bearing.

The invention will become fully apparent from the following detailed description thereof taken in conjunction with the accompanying drawings.

DETAILED DESCRIPTION OF THE PREFERRED EMBODIMENTS

Figure 4:
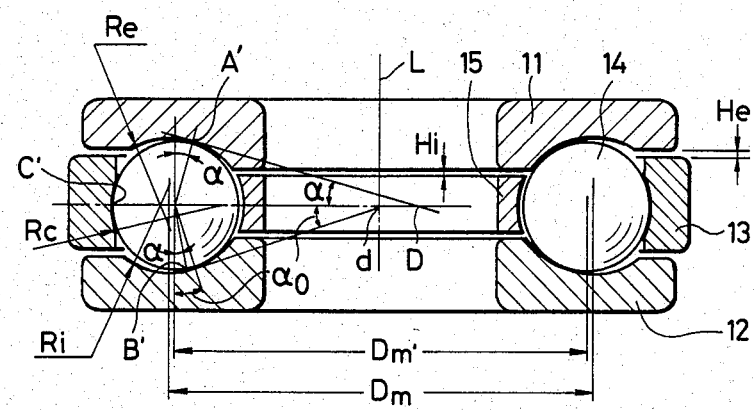
FIG. 4 is a longitudinal cross-sectional view of a thrust ball bearing according to the present invention.

A preferred embodiment of the present invention will hereinafter be described by reference to the drawings. Referring to FIG. 4 which shows the entire assembly of the ball bearing of the present invention, reference numerals 11 and 12 designate a first and a second thrust race, respectively, and reference numeral 13 denotes a third race. A plurality of balls 14 retained by a retainer 15 are interposed between these races. These balls 14 are restrained by the inner diameter of the third race 13 and positioned with their centers inside the race diameter Dm of the bearing, and the central diameter Dm' of the balls 14 is somewhat smaller than the race diameter Dm. The load points A' and B' when a thrust load is applied to the bearing are symmetrical with respect to a plane passing through the centers of the balls, and the point of intersection D between the tangential lines at those points is positioned slightly outside the center axis L of the bearing, as shown.

The race grooves of the first and second races 11 and 12 are of arcuate cross sections whose radii Re and Ri are somewhat greater than the radius of each ball 14. The load applied to the race groove of the third race 13 is smaller than the thrust loads of the first and second races and as a rule, the balls 14 do not roll on the surface of the third race but only spin thereon and therefore, no consideration need be given to the rolling fatigue of the balls. Accordingly, the surface pressure of the third race 13 may be greater than that of the thrust race within such a range that no impression is created. That is, if the radius Rc of the grooves is made greater than Re or Ri and the contact ellipse at the point of contact C' between the ball and the groove is made approximate to a circle as compared with A', B', the spin loss in this portion will assume a small value as indicated by Ms in the graph of FIG. 5. However, if the radius Rc of the groove is such a value that the groove is spherical, namely, is made equal to or greater than the radius of the circumscribed circle of the ball, there is the undesirable possibility that the third race 13 moves in the self-aligning direction and comes into contact with the side surfaces of the first and second races and therefore, if the radius Rc of the groove is made smaller than ½ of the central diameter Dm' of the balls, the above-mentioned undesirable possibility will be eliminated.

Figure 1:
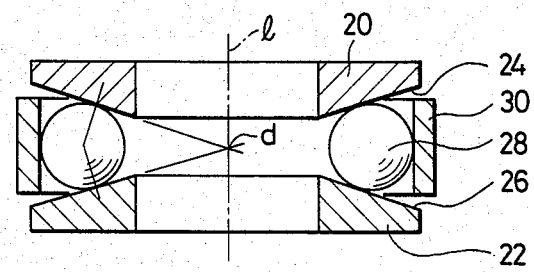
FIG. 1 shows the bearing described in the specification of U.S. Pat. No. 3,455,618 which is an example of the prior art.
Figure 2:
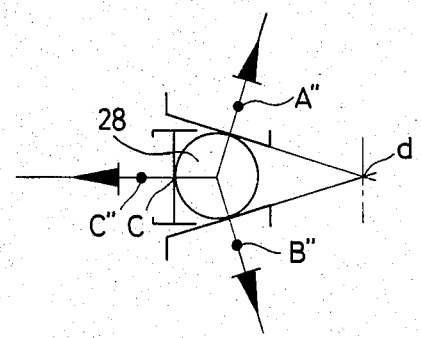
FIG. 2 shows the load in the portion of contact between the balls of FIG. 1.
Figure 3:
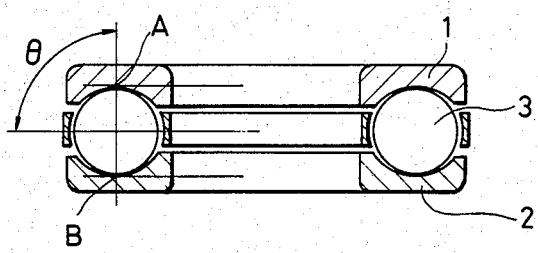
FIG. 3 is a fragmentary cross-sectional view of a thrust ball bearing according to the prior art.
Figure 5:
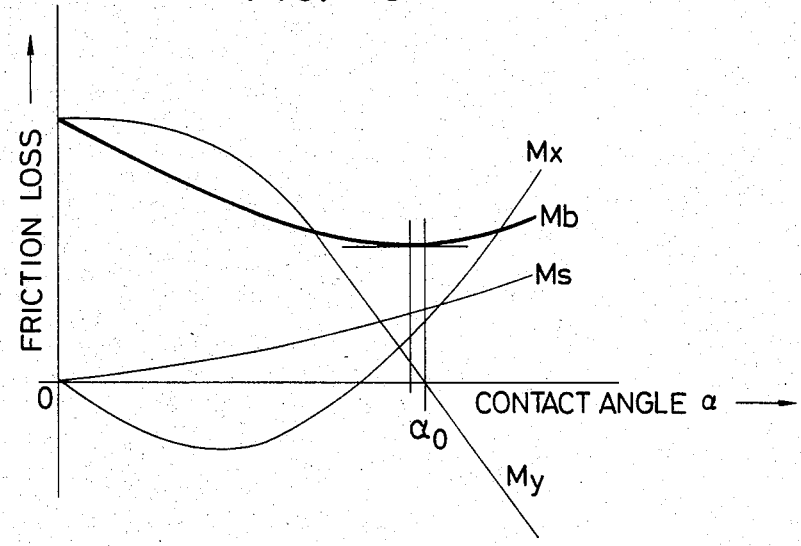
FIG. 5 is a stereotypical graph of the friction loss of the bearing of the present invention.

Each friction loss of this bearing is as stereotypically shown in FIG. 5. FIG. 5 is a theoretical graph in a case where $$Re = Ri \doteq 0.52 Da$$

$$Rc \doteq Da$$

where Da is the diameter of the balls. In FIG. 5, the ordinate represents the friction loss and the abscissa represents the contact angle $\beta$ (see FIG. 4). Incidentally, the bearing in which the contact angle $\alpha = 0$ is the case of the conventional thrust ball bearing as shown in FIG. 3. As shown in this graph, the spin resistance My of the race hardly varies with the increase in $\alpha$ at first, but soon decreases sharply and when the contact angle $\alpha$ is $\alpha_0$, no spin occurs and therefore the spin resistance My becomes zero. This $\alpha_0$ is the case where the point of intersection between the tangential lines at the load points intersects the center axis L (see FIG. 4). Also, Mx represents the rolling resistance in the circumferential direction and, when $\alpha = 0$, the rolling resistance in the circumferential direction is all represented as the spin resistance of the thrust race and therefore, Mx is zero. Ms represents the spin resistance of the race, and the load of the balls to the third race increases with the increase in $\alpha$ and therefore, Ms increases with the increase in $\alpha$. The sum total of these is the curve Mb and, as is apparent from FIG. 5, the minimum value of Mb exists in the area of $\alpha$ which is smaller than $\alpha_0$.

The present invention is based on the above-described knowledge and, as previously described, the third race 13 is provided so as to be in accord with the above-described knowledge. A preferred embodiment of the third race 13 will now be described in detail.

Figure 6:
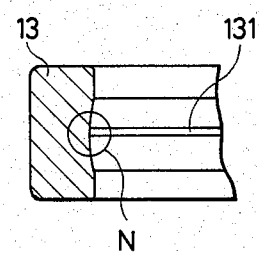
FIG. 6 is a cross-sectional view showing an oil groove provided in a third race.
Figure 7:
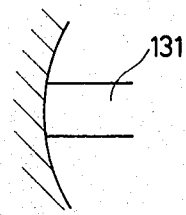
FIG. 7 is an enlarged view of the portion N of FIG. 6.

The third race 13 is not restrained anywhere with the exception that it is in contact with the balls 14 at the point C' as previously described and therefore, it rotates with the revolution of the balls 14. However, spin motion occurs as indicated by Ms in the graph of FIG. 5 and, in the case of highly accurate rotation wherein the point of contact C' hardly varies even if the machine is operated for a long time, the central portion of the ellipse in contact with the point C' may be unsatisfactorily lubricated. Therefore, it is effective to provide a circumferential shallow oil groove 131 as shown in FIG. 6. FIG. 7 is a detailed view of the portion N of FIG. 6 and shows an example of the cross-sectional shape of the oil groove 131.

Figure 8:
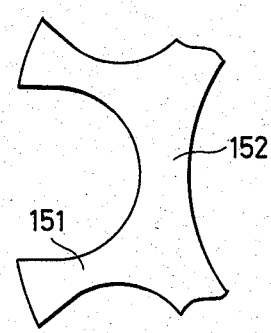
FIG. 8 is a fragmentary plan view showing a retainer.
Figure 9:
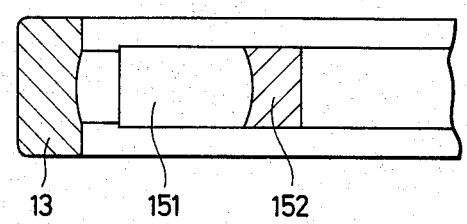
FIG. 9 shows a state in which the retainer of FIG. 8 is disposed separately from the third race.
Figure 10:
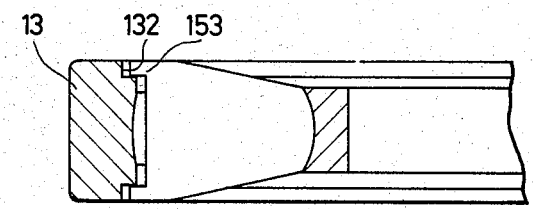
FIGS. 10 and 12 are fragmentary cross-sectional views showing a state in which the third race and the retainer are disposed in engagement with each other.
Figure 11:
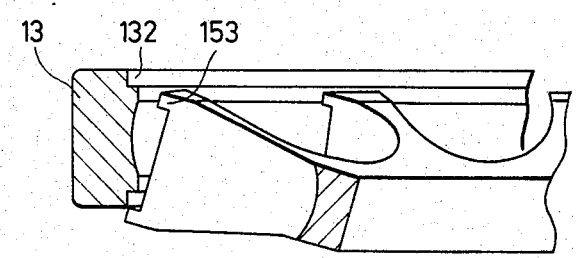
FIG. 11 is a fragmentary perspective view showing the retainer of FIG. 10.
Figure 12:
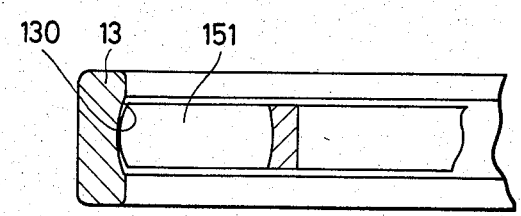

The retainer 15 is for disposing the balls 14 substantially equidistantly on a pitch circle and may preferably be of a comb-like shape as shown in FIG. 8 in order to prevent the contact between adjacent balls. That is, the bases of the pillars 151 of the retainer which hold the balls are bridged at 152 on the inner diameter side of the retainer and, if this retainer is disposed separately from the third race 13, the third race 13 can freely revolve (see FIG. 9), and if, as shown in FIG. 10, a circumferential groove 132 is provided on the inner diameter side of the side surface of the third race 13 and a telescoping projection 153 as shown in more detail in FIG. 11 is formed on the retainer and is engaged with the circumferential groove 132, there will not occur the friction for guiding the retainer. Alternatively, instead of providing the circumferential groove 132 and the projection 153, the end of a pillar 151 may be telescoped in the track 130 of the third race, as shown in FIG. 12.

Figure 13:
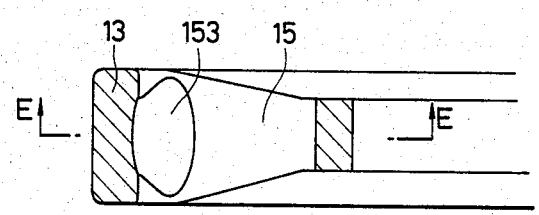
FIG. 13 is a fragmentary cross-sectional view showing a bearing in which the third race and the retainer are constructed integrally with each other.
Figure 14:
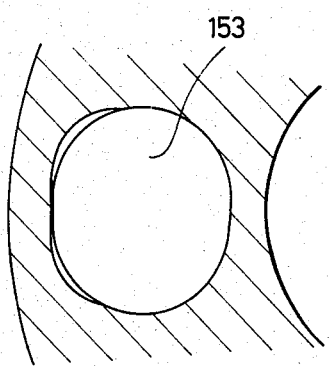
FIG. 14 is a cross-sectional view taken along line E—E of FIG. 13.

As a further alternative, as shown in FIG. 13, the third race and the retainer may be molded integrally with each other and a ball retaining window 153 may be formed therein. FIG. 14 is a cross-sectional view taken along line E—E of FIG. 13 and shows the shape of the ball retaining window.

The height of the shoulders of the track grooves of the first and second races may be made such that as shown in FIG. 4, the outside He of the track diameter is shallow and the inside Hi of the track diameter is deep, whereby the space for containing the third race 13 can be widened and the rigidity or strength of the race 13 can be enhanced. Also, since the He is shallow, the interference of a grind stone is not liable to occur during the grinding of the track grooves and therefore, the use of a grind stone having a large diameter becomes possible, and this leads to enhanced grinding efficiency.

The effects of the present invention, although mentioned briefly in the foregoing description, will be collectively described below.

(1) Since the contact angle $\alpha$ is small, the groove load at the load point of the balls and the thrust load are substantially equal to each other and therefore, substantially the same static load rating as that of the ordinary thrust ball bearing can be obtained.

(2) The sum total of the friction losses on the track surface can be minimized and particularly, the third race revolves while being not in contact with the first and second races and therefore, there is not guide friction of the races.

(3) The centrifugal force of the balls during high speed rotation does not affect the first and second races but all of it is borne by the third race. Moreover, the spin loss in the third race is very small and accordingly, high speed rotation is possible.

(4) The spin losses of the first and second thrust races are relatively small and the influence of the tangential force is small and therefore, the life of the track groove is long. The balls hardly roll relative to the third race and therefore, rolling fatigue does not occur and further, the surface pressure is low as compared with the cylindrical control ring of the aforementioned U.S. patent, and good retention of lubricating oil is provided and therefore the lubricatory characteristic is remarkably improved, and there is no guide loss because there is no sliding portion for guiding, and particularly in the bearing wherein oil grooves are provided in the track surface, the lubrication in the point of contact is kept good and therefore abrasion is small.

(5) The track groove of each race is of a shape substantially similar to that of the conventional thrust ball bearing and radial ball bearing and does not require any special machining technique and thus, it is low in manufacturing cost. Particularly, in a bearing wherein the height of the shoulders of the track grooves of the first and second races is made small on the outer diameter side, the interference thereof with the grind stone for grinding grooves is not liable to occur and therefore, the use of a grind stone having a large diameter is possible and this leads to improved grinding efficiency. At the same time, the space for containing the third race is wider and therefore, this race can be made thick and sturdy.

The present invention which has the above-described advantages is useful as the support bearing in machine tool main spindles, jet engines, gas turbine, high-pressure hydraulic pumps, traction type infinitely variable transmissions, ball screws or worm gears to which a great thrust load is applied and of which low friction or high speed rotation is required, and is particularly effective to achieve enhanced efficiency and energy saving of these instruments.

What is claimed is:

1. A thrust ball bearing comprising a row of balls, first and second axially opposed races each having a track groove whose cross-sectional radius is greater than the radius of each ball and which has a single spot of contact with each ball to allow rolling contact, a retainer disposed axially between the first and second races and diametrically inside of the balls to retain said balls between said first and second races, and a third race disposed axially between the first and second races and having a track groove circumscribing each ball with a single spot of contact, the inner diameter of the track groove of the third race being slightly smaller than the diameter of a circle circumscribing the balls when the balls are settled in the bearing so that the apex of a cone formed by the tangents of the balls at their points of contact wth the first and the second races lies slightly beyond the center axis of the bearing, the third race being supported by the balls to rotate with the balls about the center axis of the bearing so that spin contact is allowed but there is no sliding contact between each ball and the track groove of the third race in the circumferential direction thereof, the third race being formed with a circumferentially extended oil groove at a position including the center of spin motion of each ball.

2. A thrust ball bearing according to claim 1, wherein the track groove of said third race is arcuate and the radius of said arc is greater than the radius of said balls and smaller than the radius of the track diameter of said first and second races.

3. A thrust ball bearing according to claim 1, wherein said third race and said retainer are disposed separately from each other.

4. A thrust ball bearing according to claim 3, wherein a circumferential groove is provided on the inner diameter side of one or both side surfaces of said third race and said retainer is fixed with respect to said groove.

5. A thrust ball bearing according to claim 3, wherein the retainer includes an annular base portion at its inner diameter side and pillar portions projected from the annular base portion to prevent contact between adjacent balls.

6. A thrust ball bearing according to of claim 1, wherein said third race and said retainer are molded integrally with each other.

7. Thrust ball bearing according to of claim 1, wherein said third race is formed with a ball retaining window.

8. A thrust ball bearing according to claim 1, wherein the height of the shoulders of the track grooves of said first and second races is shallow outside the track diameter and deep inside the track diameter.

* * * * *